(12) United States Patent
Tsurumi

(10) Patent No.: US 10,783,654 B2
(45) Date of Patent: Sep. 22, 2020

(54) INFORMATION PROCESSING APPARATUS, INFORMATION PROCESSING METHOD, AND RECORDING MEDIUM

(71) Applicant: SONY CORPORATION, Tokyo (JP)

(72) Inventor: Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 92 days.

(21) Appl. No.: 16/066,366

(22) PCT Filed: Oct. 18, 2016

(86) PCT No.: PCT/JP2016/080770
§ 371 (c)(1),
(2) Date: Jun. 27, 2018

(87) PCT Pub. No.: WO2017/126172
PCT Pub. Date: Jul. 27, 2017

(65) Prior Publication Data
US 2019/0012799 A1 Jan. 10, 2019

(30) Foreign Application Priority Data
Jan. 18, 2016 (JP) .................... 2016-006906

(51) Int. Cl.
*G06T 7/62* (2017.01)
*G06T 1/00* (2006.01)
(Continued)

(52) U.S. Cl.
CPC .............. *G06T 7/62* (2017.01); *G01B 11/002* (2013.01); *G01B 11/02* (2013.01); *G01B 11/026* (2013.01);
(Continued)

(58) Field of Classification Search
CPC .................................... G06T 7/62; G06T 7/50
See application file for complete search history.

(56) References Cited

U.S. PATENT DOCUMENTS

2006/0204137 A1* 9/2006 Shimoda ............... G06T 11/60
382/298
2011/0304615 A1 12/2011 Ito et al.
(Continued)

FOREIGN PATENT DOCUMENTS

CN 102274631 A 12/2011
CN 102274632 A 12/2011
(Continued)

OTHER PUBLICATIONS

International Search Report and Written Opinion of PCT Application No. PCT/JP2016/080770, dated Nov. 29, 2016, 06 pages of ISRWO.

*Primary Examiner* — Tuan H Nguyen
(74) *Attorney, Agent, or Firm* — Chip Law Group

(57) ABSTRACT

An information processing apparatus includes an acquisition section that acquires an image of a real object in a real space captured by a predetermined imaging section, and a measurement result of a distance to the real object by a predetermined distance measuring section, and an estimation section that estimates a size of the real object in the real space on the basis of a size of the real object in the image and the measurement result of the distance, and by comparing the estimation result of the size to a plurality of preset size candidates, specifies the size of the real object in the real space.

13 Claims, 10 Drawing Sheets

(51) Int. Cl.
*G06T 7/60* (2017.01)
*G06T 19/00* (2011.01)
*G01B 11/00* (2006.01)
*G01B 11/02* (2006.01)
*G06T 7/50* (2017.01)
*G06T 7/70* (2017.01)
*G02B 27/01* (2006.01)

(52) U.S. Cl.
CPC ............ *G02B 27/0172* (2013.01); *G06T 1/00* (2013.01); *G06T 7/50* (2017.01); *G06T 7/60* (2013.01); *G06T 7/70* (2017.01); *G06T 19/00* (2013.01); *G06T 19/006* (2013.01); *G06T 2207/30244* (2013.01)

(56) References Cited

U.S. PATENT DOCUMENTS

| 2011/0304700 | A1 | 12/2011 | Ito et al. |
| 2011/0304710 | A1 | 12/2011 | Ito et al. |
| 2011/0304711 | A1 | 12/2011 | Ito et al. |
| 2014/0368456 | A1* | 12/2014 | Sakai ............... G06F 3/0488 345/173 |

FOREIGN PATENT DOCUMENTS

| EP | 2395763 | A2 | 12/2011 |
| EP | 2395764 | A2 | 12/2011 |
| EP | 2395765 | A2 | 12/2011 |
| EP | 2395766 | A2 | 12/2011 |
| JP | 2006-244329 | A | 9/2006 |
| JP | 2012-003328 | A | 1/2012 |
| JP | 2013-092964 | A | 5/2013 |

* cited by examiner

FIG. 7

| INCHES | 32 | 37 | 42 | 46 | 50 | 55 | 60 | 65 |
|---|---|---|---|---|---|---|---|---|
| HEIGHT | 39.9 | 46.1 | 52.3 | 57.3 | 62.3 | 68.5 | 74.7 | 80.9 |
| WIDTH | 70.8 | 81.9 | 93.0 | 101.8 | 110.7 | 121.8 | 132.8 | 143.9 |

INFORMATION PROCESSING APPARATUS, INFORMATION PROCESSING METHOD, AND RECORDING MEDIUM

CROSS REFERENCE TO RELATED APPLICATIONS

This application is a U.S. National Phase of International Patent Application No. PCT/JP2016/080770 filed on Oct. 18, 2016, which claims priority benefit of Japanese Patent Application No. JP 2016-006906 filed in the Japan Patent Office on Jan. 18, 2016. Each of the above-referenced applications is hereby incorporated herein by reference in its entirety.

TECHNICAL FIELD

The present disclosure relates to an information processing apparatus, an information processing method, and a recording medium.

BACKGROUND ART

Recently, as image recognition technology has become more advanced, it has become possible to recognize the position and attitude of a real object (that is, a physical object in a real space) included in an image captured by an imaging apparatus. The technology called augmented reality (AR) is known as one applied example of such physical object recognition. By utilizing AR technology, it becomes possible to present, to a user, virtual content (hereinafter also designated a "virtual object") in various modes such as text, icons, or animations, superimposed onto a real object captured in an image of a real space. For example, Patent Literature 1 discloses one example of AR technology.

Also, by an application of physical object recognition technology, it becomes possible to execute what is called localization for recognizing the position in real space of an imaging section (and by extension, the apparatus provided with the imaging section) that captures an image of an object. The technology called simultaneous localization and mapping (SLAM) is one example of technology for realizing such localization.

CITATION LIST

Patent Literature

Patent Literature 1: JP 2013-92964A

DISCLOSURE OF INVENTION

Technical Problem

As one example of a method for realizing localization, there is a method in which a real object of known size and shape, such as a known marker or the like, is detected inside an image captured by an imaging section to thereby estimate the positional relationship between the real object and the imaging section.

On the other hand, the size of the real object to be used as the reference for localization is not necessarily known in some cases. For example, in the case in which a marker that acts as the reference for localization is displayed on a display, there is a possibility that the size of the marker may change in accordance with the size of the display. In this way, in a state in which the size of the real object that acts as the reference for localization is unknown, it may be difficult to estimate the positional relationship between the real object and the imaging section more accurately (that is, execute localization more accurately) in some cases.

Accordingly, the present disclosure proposes an information processing apparatus, an information processing method, and a recording medium capable of estimating the size of an object in a real space.

Solution to Problem

According to the present disclosure, there is provided an information processing apparatus including: an acquisition section that acquires an image of a real object in a real space captured by a predetermined imaging section, and a measurement result of a distance to the real object by a predetermined distance measuring section; and an estimation section that estimates a size of the real object in the real space on the basis of a size of the real object in the image and the measurement result of the distance, and by comparing the estimation result of the size to a plurality of preset size candidates, specifies the size of the real object in the real space.

In addition, according to the present disclosure, there is provided an information processing method including: acquiring an image of a real object in a real space captured by a predetermined imaging section, and a measurement result of a distance to the real object by a predetermined distance measuring section; and estimating, by a processor, a size of the real object in the real space on the basis of a size of the real object in the image and the measurement result of the distance, and by comparing the estimation result of the size to a plurality of preset size candidates, specifying the size of the real object in the real space.

In addition, according to the present disclosure, there is provided a recording medium storing a program for causing a computer to execute: acquiring an image of a real object in a real space captured by a predetermined imaging section, and a measurement result of a distance to the real object by a predetermined distance measuring section; and estimating a size of the real object in the real space on the basis of a size of the real object in the image and the measurement result of the distance, and by comparing the estimation result of the size to a plurality of preset size candidates, specifying the size of the real object in the real space.

Advantageous Effects of Invention

According to the present disclosure as described above, there is provided an information processing apparatus, an information processing method, and a program capable of estimating the size of an object in a real space.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is an explanatory diagram for explaining an overview of an information processing system according to a second embodiment of the present disclosure.

MODE(S) FOR CARRYING OUT THE INVENTION

Figure 1:
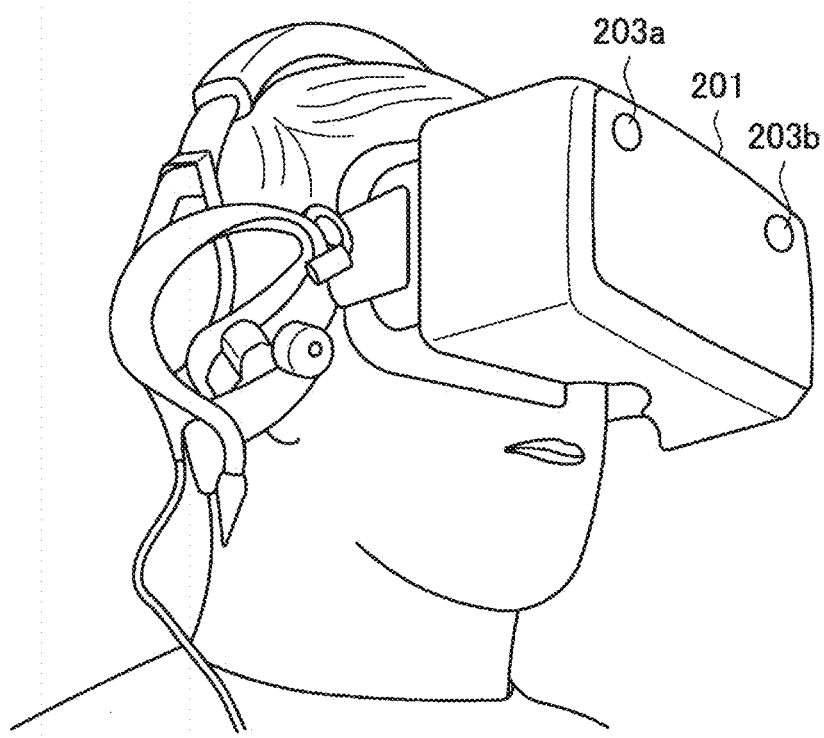
FIG. 1 is an explanatory diagram for explaining an example of a schematic configuration of a terminal apparatus according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

1. First Embodiment
1.1. Terminal device configuration
1.2. Principle of localization
1.3. Functional configuration
1.4. Processes
1.5. Evaluation
2. Second Embodiment
2.1. Basic principle
2.2. Functional configuration
2.3. Processes
2.4. Evaluation
3. Exemplary hardware configuration
4. Conclusion

1. FIRST EMBODIMENT

<1.1. Terminal Device Configuration>

First, an example of a schematic configuration of a terminal apparatus according to the first embodiment will be described with reference to FIG. 1. FIG. 1 is an explanatory diagram for explaining an example of the schematic configuration of the terminal apparatus according to the present embodiment.

As illustrated in FIG. 1, a terminal apparatus 20 according to the present embodiment includes an output section 201, and imaging sections 203a and 203b. In addition, the terminal apparatus 20 according to the present embodiment is configured as what is called a head-mounted display (HMD). In other words, the terminal apparatus 20 is configured so that, by being worn on a user's head, the output section 201 (for example, a display panel) for displaying images is held in front of the user's eyes.

The imaging sections 203a and 203b are configured as what is called a stereo camera, and are provided at mutually different positions on the terminal apparatus 20 so that, when the terminal apparatus 20 is worn on the user's head, the imaging sections 203a and 203b point in the direction the user's head is facing (that is, the front of the user). On the basis of such a configuration, the imaging sections 203a and 203b image a subject (in other words, a real object positioned in the real space) in front of the user wearing the terminal apparatus 20 from mutually different position (in other words, different viewpoints). With this arrangement, the terminal apparatus 20 becomes able to acquire an image of the subject positioned in front of the user, and in addition, compute the distance from the terminal apparatus 20 to the subject on the basis of the parallax between the images captured by each of the imaging sections 203a and 203b.

In addition, the terminal apparatus 20 according to the present embodiment may also be provided with an acceleration sensor and an angular velocity sensor (gyro sensor), for example, and be configured to be able to detect the motion of the head (the attitude of the head) of the user wearing the terminal apparatus 20. As a specific example, the terminal apparatus 20 may detect the component in each of the yaw direction, pitch direction, and roll direction as the motion of the user's head, and thereby recognize a change in at least one of the position and the attitude of the user's head.

On the basis of a configuration like the above, the terminal apparatus 20 according to the present embodiment becomes able to present, to the user through the output section 201, an image of the subject positioned on front of the user, matched to the motion of the user's head. Also, at this time, the terminal apparatus 20 is also capable of presenting, to the user through the output section 201, an image in which virtual content (that is, a virtual object) is superimposed onto the subject (that is, a real object positioned in the real space), on the basis of what is called AR technology. Note that an example of the method by which the terminal apparatus 20 estimates the position and attitude of itself in the real space (that is, localization) when superimposing the virtual object onto the real object will be described later in detail.

Note that examples of the head-mounted display (HMD) applicable as the terminal apparatus 20 include a video see-through HMD, a see-through HMD, and a retinal projection HMD, for example.

In the case in which a video see-through HMD is worn on the user's head or face, the video see-through HMD is worn to cover the user's eyes, and a display unit such as a display is held in front of the user's eyes. Further, the video see-through HMD includes an imaging unit for imaging the surrounding scene, and causes the display unit to display an image of the scene in front of the user imaged by the imaging unit. With such a configuration, for the user wearing the video see-through HMD, it is difficult for the outside scene to enter into one's field of view directly, but it becomes possible to check the outside scene by an image displayed on the display unit. For example, the terminal apparatus 20 illustrated in FIG. 1 corresponds to an example of a video see-through HMD.

A see-through HMD, for example, uses a half mirror and a transparent light guide plate to hold a virtual image optical system including a transparent light guide unit and the like in front of the user's eyes, and display an image on the inner side of the virtual image optical system. For this reason, for the user wearing the see-through HMD, it is possible for the outside scene to enter into one's field of view, even while viewing the image displayed on the inner side of the virtual image optical system. According to such a configuration, on the basis of AR technology, for example, the see-through HMD is capable of superimposing an image of the virtual object onto an optical image of the real object positioned in the real space, in accordance with a recognition result of at least one of the position and the attitude of the see-through HMD. Note that specific examples of the see-through HMD include what is called a glasses-style wearable device, in which the part corresponding to lenses of a pair of glasses are configured as the virtual image optical system.

With a retinal projection HMD, a projection unit is held in front of the user's eyes, and an image is projected from the projection unit towards the user's eyes so that the image is superimposed onto the outside scene. More specifically, in a retinal projection HMD, an image is projected directly from the projection unit onto the retina of the user's eyes, and the image is formed on the retina. With such a configuration, the viewing of a clearer picture becomes possible, even in the case of a near-sighted or a far-sighted user. Also, for the user wearing the retinal projection HMD, it becomes possible for the outside scene to enter into one's field of view, even while viewing the image projected from the projection unit. According to such a configuration, on the basis of AR technology, for example, the retinal projection HMD is capable of superimposing an image of the virtual object onto an optical image of the real object positioned in the real space, in accordance with a recognition result of at least one of the position and the attitude of the retinal projection HMD.

Note that for reference, besides the examples described above, an HMD called an immersive HMD is also possible. The immersive HMD is worn to cover the user's eyes, similarly to the video see-through HMD, and a display unit such as a display is held in front of the user's eyes. For this reason, for the user wearing the immersive HMD, it is difficult for the outside scene (that is, the scene of the real world) to enter into one's field of view directly, and only the picture displayed on the display unit enters one's field of view. With such a configuration, the immersive HMD is capable of imparting a sense of immersion to the user viewing an image.

The above describes an example of the schematic configuration of the terminal apparatus according to the present embodiment with reference to FIG. 1. Note that the configuration of the terminal apparatus 20 described above is merely one example, and the configuration is not particularly limited insofar as it is possible to capture an image of the front of the user wearing the terminal apparatus 20, and additionally, compute the distance from the terminal apparatus 20 to a captured subject. As a specific example, instead of the imaging sections 203a and 203b configured as a stereo camera, a monocular imaging section and a distance measuring section that measures the distance to the subject may be provided.

Note that the configuration and method are not particularly limited, insofar as the distance between the terminal apparatus 20 and the subject is measurable. As a specific example, the distance between the terminal apparatus 20 and the subject may be measured on the basis of methods such as multi-camera stereo, motion parallax, time-of-flight (TOF), and structured light. Herein, TOF refers to a method of projecting light such as infrared rays onto the subject and measuring, for each pixel, the time for the contributed light to be reflected by the subject and return, and thereby obtaining an image (also called a depth map) including the distance (depth) to the subject on the basis of the measurement results. Also, structured light is a method of irradiating the subject with a pattern by light such as infrared rays and capturing an image, and on the basis of changes in the pattern obtained from the imaging result, obtaining a depth map including the distance (depth) to the subject. Also, motion parallax refers to a method of measuring the distance to the subject on the basis of parallax, even with what is called a monocular camera. Specifically, by moving the camera, the subject is captured from mutually different viewpoints, and the distance to the subject is measured on the basis of the parallax between the captured images. Note that by recognizing the motion distance and motion direction of the camera with various sensors at this time, it is possible to measure the distance to the subject more precisely. Note that the configuration of the imaging section (such as a monocular camera or stereo camera, for example) may be changed in accordance with the distance measuring method.

<1.2. Principle of Localization>

Figure 2:
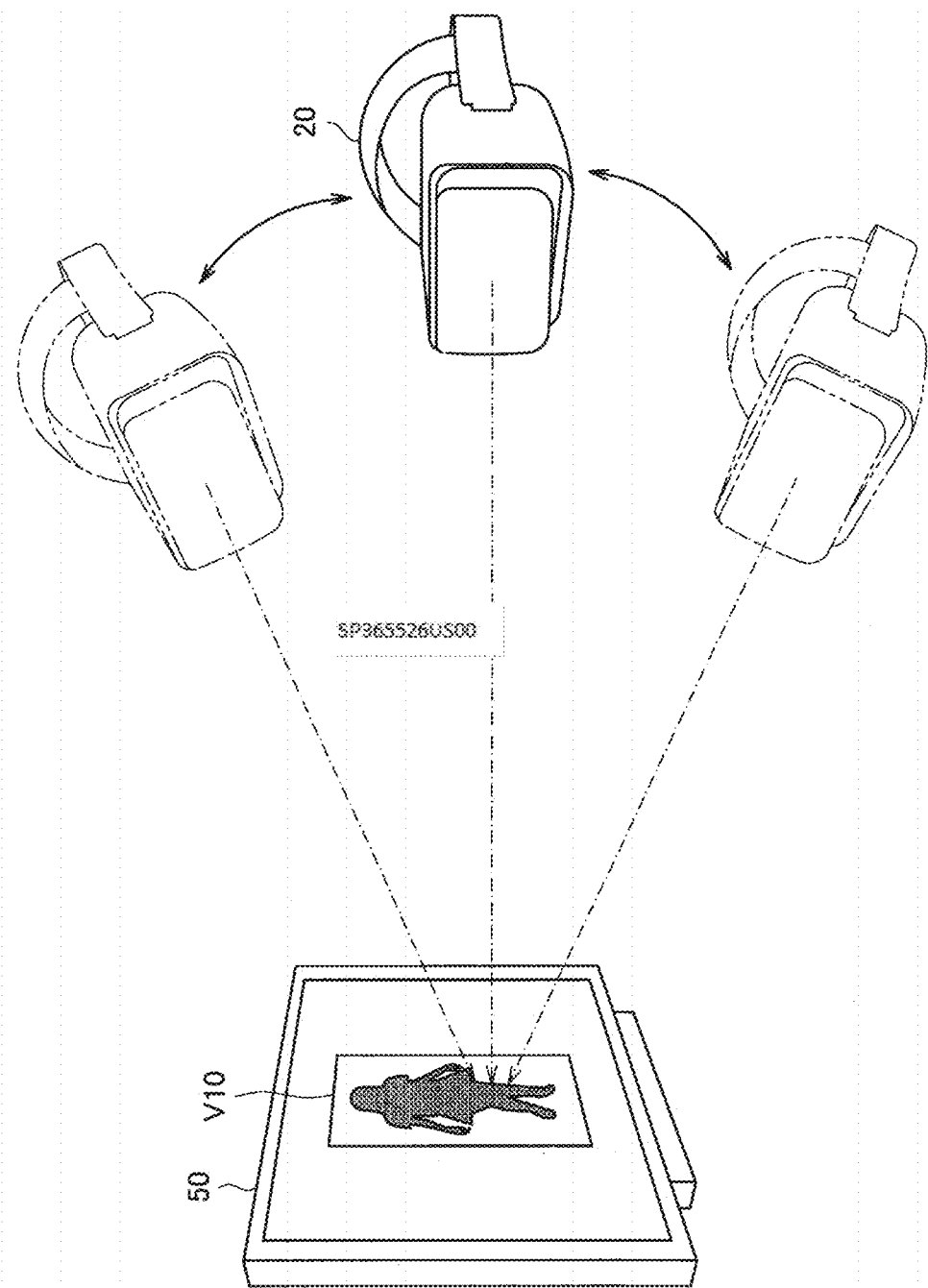
FIG. 2 is an explanatory diagram for explaining an example of the principle of localization.

Next, when the terminal apparatus 20 superimposes a virtual object onto a real object, an example of the principle of the technique for estimating the position and attitude of itself in a real space (that is, localization) will be described, and furthermore, a technical problem of the present embodiment will be summarized. For example, FIG. 2 is an explanatory diagram for explaining an example of the principle of localization.

As a specific example of localization, the terminal apparatus 20 uses an imaging section, such as a camera provided on itself, to capture a marker V10 of known size presented on a real object in the real space. Additionally, by analyzing the captured image, the terminal apparatus 20 estimates at least one of the relative position and attitude of oneself with respect to the marker V10 (and by extension, the real object on which the marker V10 is presented). Note that the following description focuses on a case in which the terminal apparatus 20 estimates the position and the attitude of itself, but the terminal apparatus 20 may also estimate only one of the position and attitude of itself, as described earlier.

Specifically, it is possible to estimate the relative direction of the imaging section (and by extension, the terminal apparatus 20 in which the imaging section is provided) with respect to the marker V10, in accordance with the direction of the marker V10 (for example, the direction of a pattern or the like of the marker V10) captured in the image. Also, in the case in which the size of the marker V10 is known, it is possible to estimate the distance between the marker V10 and the imaging section (that is, the terminal apparatus 20 in which the imaging section is provided), in accordance with the size of the marker V10 in the image. More specifically, if the marker V10 is captured from farther away, the marker V10 is captured smaller. Also, the range of the real space captured in the image at this time can be estimated on the basis of the angle of view of the imaging section. By utilizing the above characteristics, it is possible to back-calculate the distance between the marker V10 and the imaging section in accordance with the size of the marker V10 captured in the image (in other words, the proportion of the angle of view occupied by the marker V10). According to a configuration like the above, the terminal apparatus 20 becomes able to estimate the relative position and attitude of itself with respect to the marker V10.

In addition, the technology named simultaneous localization and mapping (SLAM) may also be utilized for localization of the terminal apparatus 20. SLAM refers to a technology that executes localization and the creation of an environment map in parallel by utilizing an imaging section such as a camera, various sensors, an encoder, and the like. As a more specific example, with SLAM (particularly visual SLAM), the three-dimensional shape of a captured scene (or subject) is successively reconstructed on the basis of a moving image captured by the imaging section. Additionally, by associating the reconstruction result of the captured scene with a detection result of the position and attitude of the imaging section, the creation of a map of the surrounding environment and the estimation of the position and attitude of the imaging section (and by extension, the terminal apparatus 20) are performed. Note that, for example, by providing the terminal apparatus 20 with various sensors, such as an acceleration sensor and an angular velocity sensor, it is possible to estimate the position and the attitude of the imaging section as information indicating relative change on the basis of the detection results of the sensors. Obviously, as long as the position and the attitude of the imaging section can be estimated, the method is not necessarily limited only to a method based on the detection results of various sensors such as an acceleration sensor and an angular velocity sensor.

Based on a configuration like the above, for example, estimation results for the relative position and attitude of the terminal apparatus 20 with respect to the known marker V10 based on an imaging result of marker V10 by the imaging section may also be utilized in an initialization process and position correction in SLAM described above. According to such a configuration, even under circumstances in which the marker V10 is not included inside the angle of view of the imaging section, by localization based on SLAM receiving the results of previously executed initialization and position correction, the terminal apparatus 20 is able to estimate the position and attitude of oneself with respect to the marker V10 (and by extension, the real object on which the marker V10 is presented).

In addition, by utilizing the localization result described above, on the basis of AR technology, the terminal apparatus 20 is also able to present a virtual object to the user so that the virtual object is superimposed onto a desired position (a desired real object) in the real space.

On the other hand, in applications such as games, for example, as illustrated in FIG. 2, cases in which the marker V10 is displayed on a display apparatus 50 such as a display may be anticipated. In such cases, for example, by causing the marker V10 displayed on the display apparatus 50 to be recognized (for example, by causing the imaging section to capture an image), the terminal apparatus 20 estimates the relative position and attitude of confidence with respect to the display apparatus 50 (that is, executes localization). Subsequently, the terminal apparatus 20 utilizes the estimation results of the position and attitude of itself with respect to the display apparatus 50 in the presentation of a virtual object based on AR technology, for example.

Figure 3:
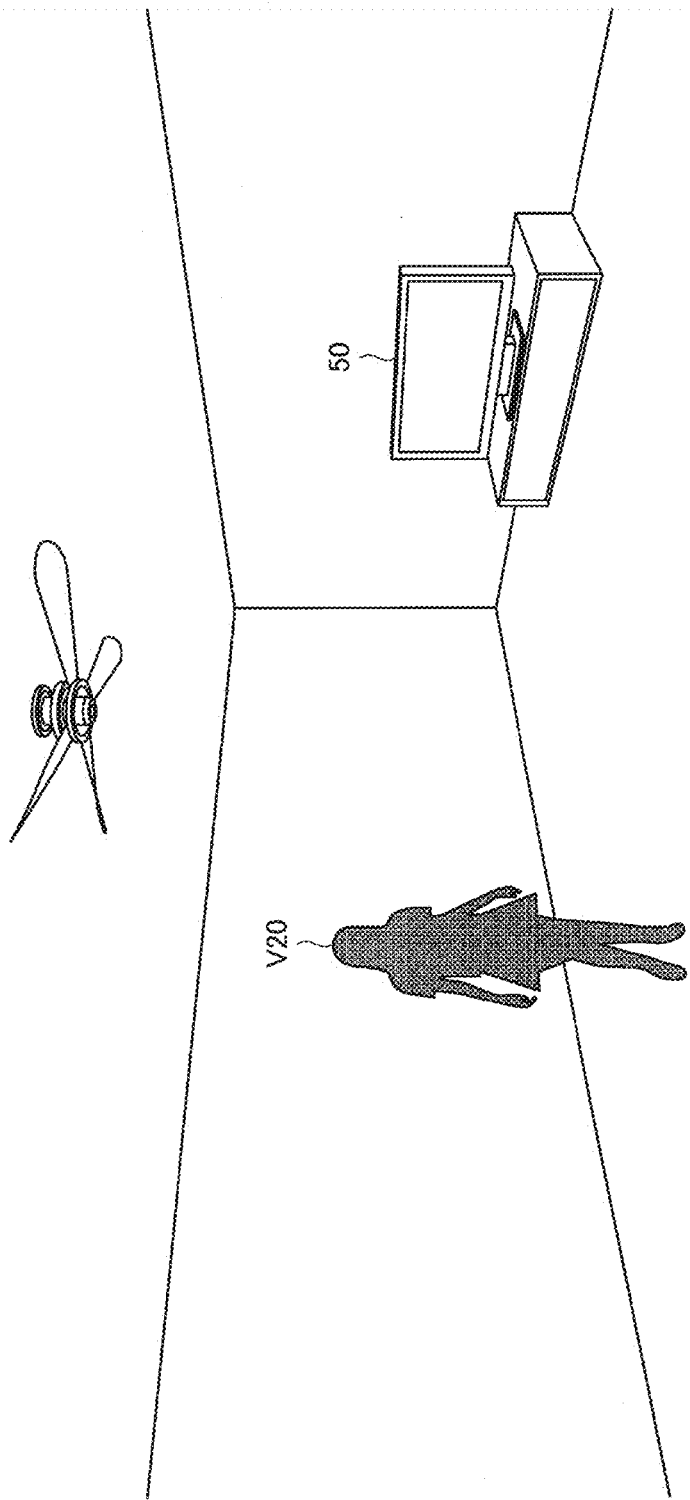
FIG. 3 is an explanatory diagram for explaining an example of a process utilizing a localization result.

For example, FIG. 3 is an explanatory diagram for explaining an example of a process utilizing a localization result, and illustrates an example of a case of presenting a virtual object on the basis of AR technology. Specifically, on the basis of estimation results of the relative position and attitude of itself with respect to the display apparatus 50, the terminal apparatus 20 presents a virtual object V20 to the user through the output section 201, so that the virtual object V20 is superimposed at a desired position in the real space in which the display apparatus 50 is disposed.

However, the size of the marker used for localization is not necessarily known. For example, like in the example illustrated in FIG. 2, in the case of displaying the marker V10 on the display apparatus 50, the size of the marker V10 in the real space is different depending on the size (for example, the number of inches) of the display apparatus 50.

Figure 4:
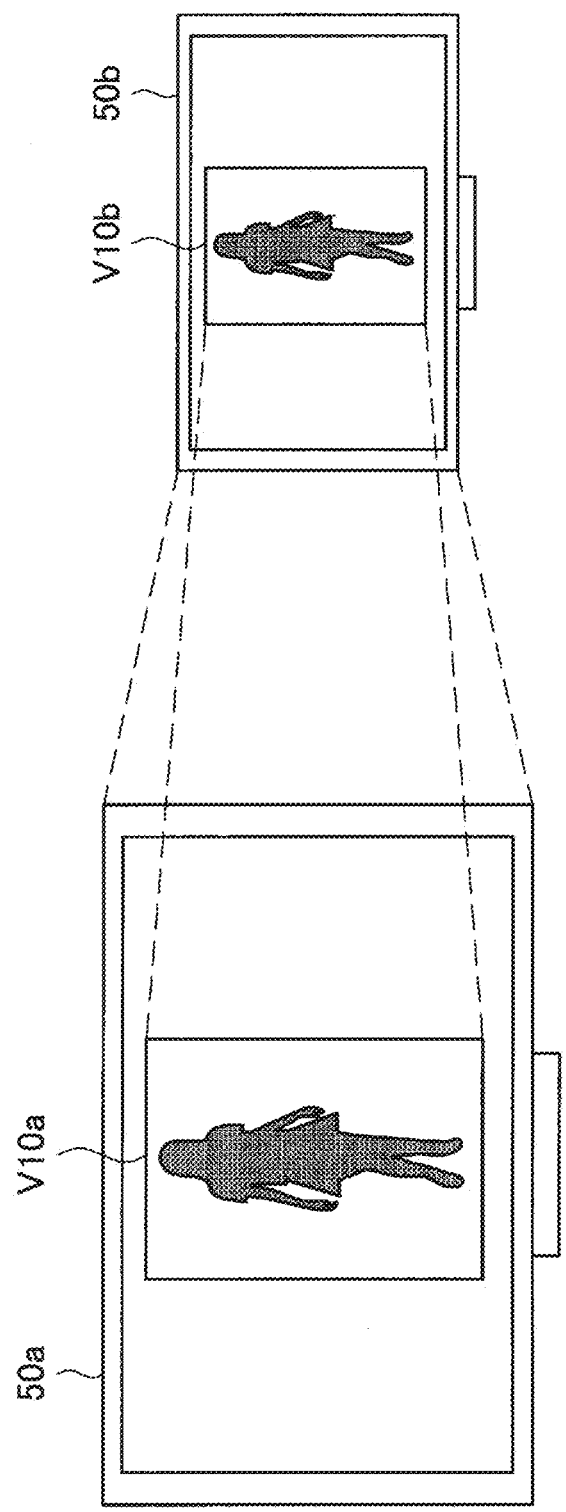
FIG. 4 is an explanatory diagram for explaining a technical problem of an information processing system according to the embodiment.

For example, FIG. 4 is an explanatory diagram for describing a technical problem of the information processing system according to the present embodiment, and illustrates an example of a case of displaying a marker onto display apparatus of mutually different sizes. Specifically, in the example illustrated in FIG. 4, the same image presenting the marker V10 is displayed on display apparatus 50a and 50b with mutually different numbers of inches. As illustrated in FIG. 4, even if the marker V10 is displayed in the same way on each of the display apparatus 50a and 50b, the size of the marker V10a displayed on the display apparatus 50a and the size of the marker V10b displayed on the display apparatus 50b in the real space are different.

Also, a marker such as an explicitly affixed sticker is not necessarily used as the marker for localization. As a specific example, a case of utilizing the cover of a book or the like as a marker may be anticipated. In such a case, the sizes of books are various, like the differences between what are called hardcovers, such as deluxe editions and full bindings, and what are called paperbacks, and even in the case of focusing on similar titles, books of different sizes exist in some cases.

In this way, in the case in which the size of the marker used for localization is unknown, the terminal apparatus 20 may have difficulty estimating the dimensions in the real space accurately, and by extension, may have difficulty executing localization accurately in some cases. Accordingly, the present disclosure proposes an example of a mechanism capable of estimating the position and the attitude of the imaging section (and by extension, the terminal apparatus 20) with respect to a real object by estimating the size of the real object, even in the case in which the size of the real object is unknown. Accordingly, hereinafter, features of the information processing system according to the present embodiment will be described in further detail.

<1.3. Functional Configuration>

Figure 5:
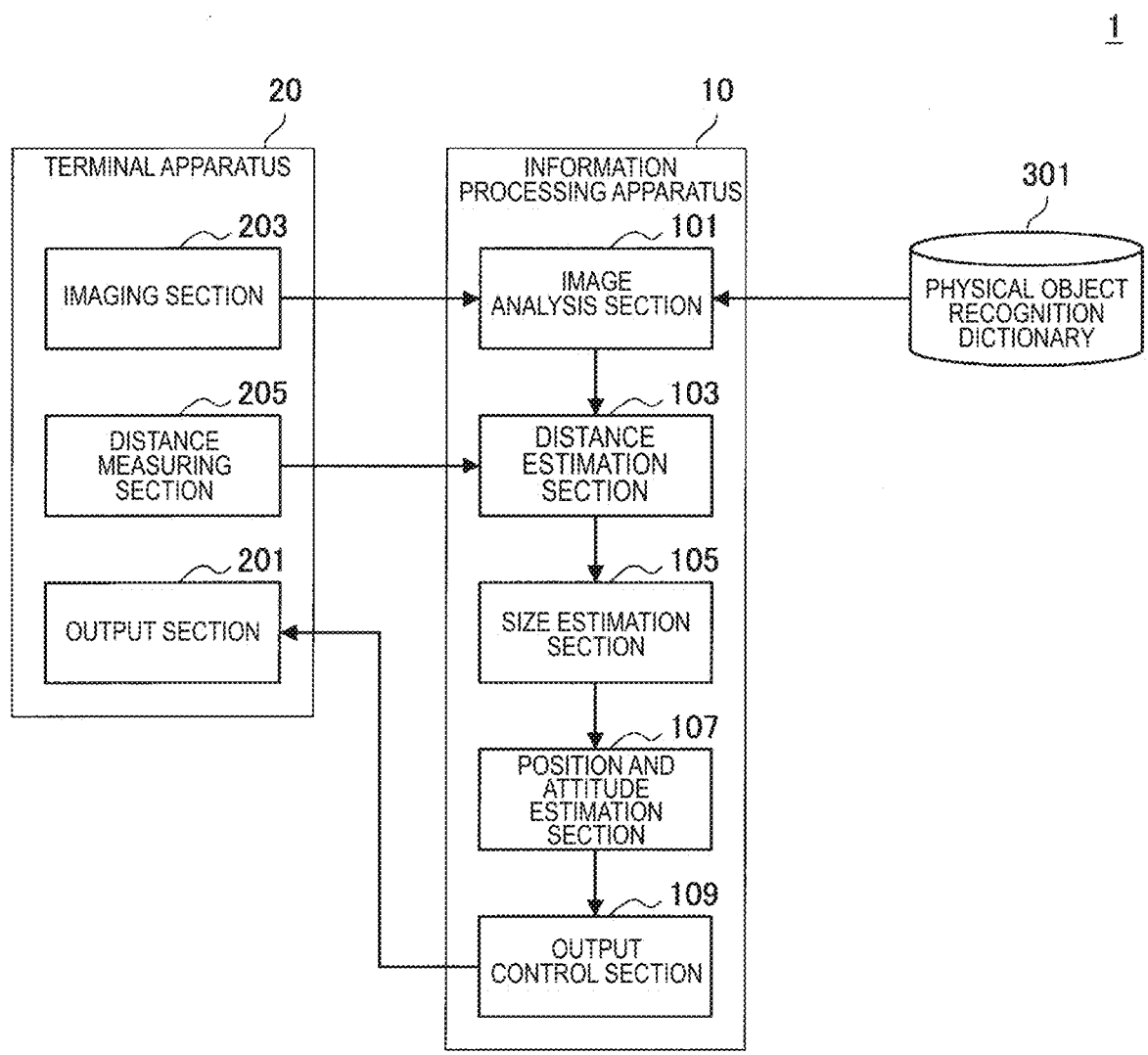
FIG. 5 is a block diagram illustrating an example of a functional configuration of the information processing system according to the embodiment.

First, FIG. 5 will be referenced to describe an example of the functional configuration of the information processing system according to the present embodiment. FIG. 5 is a block diagram illustrating an example of the functional configuration of the information processing system according to the present embodiment.

As illustrated in FIG. 5, the information processing system 1 according to the present embodiment includes the terminal apparatus 20, the information processing apparatus 10, and a physical object recognition dictionary 301. The terminal apparatus 20 and the information processing apparatus 10 are configured to be able to transmit and receive information with each other over a predetermined network. Note that the type of the network that connects the terminal apparatus 20 and the information processing apparatus 10 is not particularly limited. As a specific example, the network may be configured as what is called a wireless network, such as a network based on the Wi-Fi (registered trademark) standard, for example. Also, as another example, the network may be configured as the Internet, a dedicated line, a local area network (LAN), a wide area network (WAN), or the like. In addition, the network may also include multiple networks, and may also be configured as a partially wired network.

One specific example of the terminal apparatus 20 is the terminal apparatus 20 described with reference to FIG. 1. More specifically, as illustrated in FIG. 5, the terminal apparatus 20 includes an output section 201, an imaging section 203, and a distance measuring section 205. The output section 201 corresponds to the output section 201 illustrated in FIG. 1. Note that in the example illustrated in FIG. 5, from among the imaging sections 203a and 203b configured as a stereo camera in FIG. 1, the portion related to the capturing of images is illustrated as the imaging section 203, while the portion related to the measurement of the distance to the subject is illustrated as the distance measuring section 205.

In other words, the imaging section 203 captures an image of a physical object (the subject) in the real space, and outputs the captured image to the information processing apparatus 10. Also, the distance measuring section 205 measures the distance to the physical object (the subject) in the real space, and outputs depth information indicating the measurement result to the information processing apparatus 10.

Next, the configuration of the information processing apparatus 10 will be focused on. As illustrated in FIG. 5, the information processing apparatus 10 includes an image analysis section 101, a distance estimation section 103, a size estimation section 105, a position and attitude estimation section 107, and an output control section 109.

The image analysis section 101 acquires the image captured by the imaging section 203 and performs analysis processing on the acquired image, and thereby recognizes the physical object (real object) captured as the subject in the image. At this time, for example, the image analysis section 101 may compute feature quantities on the basis of features (for example, features such as the shape and pattern) of the physical object captured in the image, cross-reference with information indicating the feature quantities of known physical objects, and thereby recognize the physical object captured in the image. Note that it is sufficient for the information indicating the feature quantities of known physical objects to be stored in advance in a storage area readable by the information processing apparatus 10. For example, the physical object recognition dictionary 301 illustrates an example of a storage area for storing information indicating the feature quantities of known physical objects.

By the above, the image analysis section 101 recognizes the physical object captured in the image. By such a recognition result, it becomes possible to recognize the position and size of the physical object in the image. Subsequently, the image analysis section 101 outputs information indicating a recognition result of the physical object captured in the image (hereinafter simply designated the "physical object recognition result" in some cases) to the distance estimation section 103. Note that the acquired image (that is, the image captured by the imaging section 203) is preferably held in a storage area (omitted from illustration) that can be referenced by each configuration of the information processing apparatus 10 described later, for example. Obviously, as long as each configuration of the information processing apparatus 10 is able to reference the acquired image, the method is not particularly limited. Given the above, the following description assumes that each configuration of the information processing apparatus 10 is able to reference the acquired image as needed.

The distance estimation section 103 acquires, from the distance measuring section 205, depth information indicating a measurement result of the distance to the physical object captured as the subject by the imaging section 203. As a specific example, in the case in which the terminal apparatus 20 uses a stereo camera like the example illustrated in FIG. 1 as the configuration corresponding to the distance measuring section 205, the distance estimation section 103 may acquire information indicating parallax based on the imaging result by the stereo camera as the depth information. Also, in the case in which the distance measuring section 205 is a configuration that measures the distance to the subject (physical object) on the basis of the TOF method, the distance estimation section 103 may acquire what is called a depth map containing information indicating the distance (depth) to the subject measured for every pixel as the depth information.

In addition, the distance estimation section 103 acquires information indicating the physical object recognition result from the image analysis section 101. Subsequently, the distance estimation section 103 estimates the distance to the recognized physical object on the basis of the acquired information indicating the physical object recognition result and depth information. As a more specific example, the distance estimation section 103 recognizes (estimates) the distance to the physical object by recognizing the position of the physical object in the image on the basis of the physical object recognition result, and extracting the measurement result of the distance corresponding to the recognized position in the image from the acquired depth information.

Subsequently, the distance estimation section 103 outputs information indicating the acquired physical object recognition result and information indicating the estimation result of the distance to the physical object to the size estimation section 105.

The size estimation section 105 acquires the information indicating the physical object recognition result and the information indicating the estimation result of the distance to the physical object from the distance estimation section 103, and on the basis of the acquired information, estimates the size of the physical object in the real space. As a specific example, the size estimation section 105 estimates the size of the physical object in the real space on the basis of the size of the physical object in the image and the estimation result of the distance to the physical object. Note that, as described earlier, the range of the real space captured in the image can be estimated on the basis of the angle of view of the imaging section 203. For this reason, if the distance to the physical object captured in the image can be estimated, it becomes possible to estimate the size of the physical object in the real space on the basis of the size of the physical object in the image (that is, the range of the physical object occupying the angle of view).

Subsequently, the size estimation section 105 outputs information indicating the acquired physical object recognition result and information indicating the estimation result of the size of the physical object to the position and attitude estimation section 107.

The position and attitude estimation section 107 is a configuration for executing processes related to estimating the position and the attitude of the terminal apparatus 20 in the real space (also called localization-related processes). The position and attitude estimation section 107 acquires the information indicating the physical object recognition result and the information indicating the estimation result of the size of the physical object from the size estimation section 105, and on the basis of the acquired information, estimates the relative position and attitude of the terminal apparatus 20 with respect to the physical object. Note that the relative position and attitude of the terminal apparatus 20 with respect to the recognized physical object (that is, the physical object captured in the image) can be estimated on the basis of the methods described earlier by recognizing that the size of the physical object is known on the basis of the acquired estimation result of the size of the physical object.

In addition, at this time, the position and attitude estimation section 107 may also estimate the relative position and attitude of the terminal apparatus 20 with respect to the recognized physical object on the basis of SLAM. In this case, the position and attitude estimation section 107 may acquire information indicating changes in the position and the attitude of the terminal apparatus 20 from a predetermined detection section which is not illustrated (such as an acceleration sensor and an angular velocity sensor provided in the terminal apparatus 20, for example), and use the information for localization (that is, estimation of the position and the attitude of the terminal apparatus 20 with respect to the physical object) based on SLAM.

Subsequently, the position and attitude estimation section 107 outputs information indicating the acquired physical object recognition result and information indicating the estimation result of the position and the attitude of the terminal apparatus 20 in the real space to the output control section 109.

The output control section 109 is a configuration for presenting, to the user through the output section 201, a virtual object on the basis of AR technology so that the virtual object is superimposed onto the real space. Note that the output control section 109 corresponds to an example of a "display control section".

Specifically, the output control section 109 acquires information indicating the physical object recognition result and information indicating the estimation result of the position and the attitude of the terminal apparatus 20 in the real space from the position and attitude estimation section 107. With this arrangement, the output control section 109 becomes able to estimate the positional relationship between the terminal apparatus 20 and the recognized physical object in the real space, and the three-dimensional position and attitude of the physical object in the real space.

Additionally, in accordance with the positional relationship between the terminal apparatus 20 and the recognized physical object in the real space, for example, the output control section 109 causes the output section 201 to display a virtual object so that the virtual object is superimposed onto a desired position in the real space.

As a more specific example, the case in which the terminal apparatus 20 is configured as a video see-through HMD will be focused on. In this case, the output control section 109 superimposes a virtual object onto the image captured by the imaging section 203 in accordance with the positional relationship between the terminal apparatus 20 and the recognized physical object in the real space, and causes the output section 201 to display the image with the superimposed virtual object. At this time, the output control section 109 preferably adjusts the display position of the virtual object and the size of the virtual object in accordance with the positional relationship between the terminal apparatus 20 and the recognized physical object in the real space. With this arrangement, the user becomes able to perceive an image in which the virtual object seems to exist in front of oneself.

Also, as another example, the case in which the terminal apparatus 20 is configured as a see-through HMD will be focused on. In this case, when displaying a virtual object on the inner side of a virtual image optical system (corresponding to the output section 201), it is sufficient for the output control section 109 to control the display position and the size of the virtual object in accordance with the positional relationship between the terminal apparatus 20 and the recognized physical object in the real space. With this arrangement, the user becomes able to perceive a virtual object so that the virtual object seems to exist in front of oneself.

Note that the configuration illustrated in FIG. 5 is merely one example, and the configuration of the information processing system 1 is not necessarily limited to the example illustrated in FIG. 5. As a specific example, the terminal apparatus 20 and the information processing apparatus 10 may also be configured in an integrated manner. Also, as another example, part of the configuration of the information processing apparatus 10 may also be provided in a different apparatus (such as the terminal apparatus 20 or an external server, for example) from the information processing apparatus 10. Also, the physical object recognition dictionary 301 may be built into the information processing apparatus 10, or provided in an external server.

The above references FIG. 5 to describe an example of a functional configuration of the information processing system 1 according to the present embodiment.

<1.4. Processes>

Figure 6:
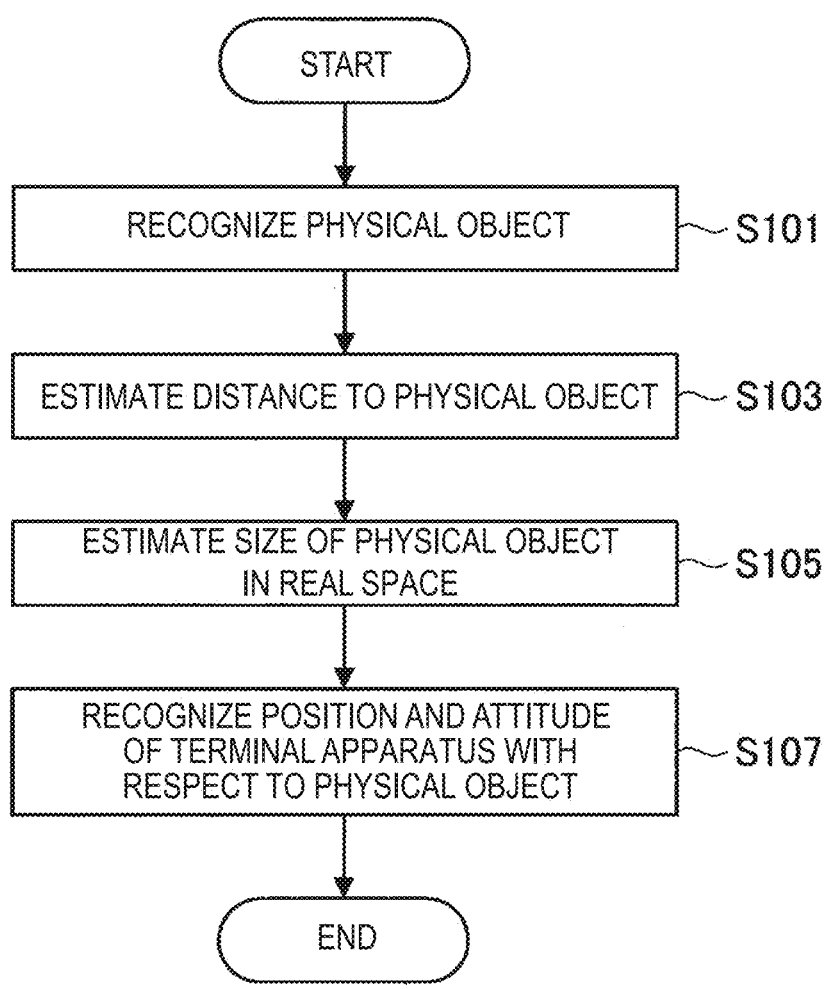
FIG. 6 is a flowchart illustrating an example of the flow of a series of processes of the information processing system according to the embodiment.

Next, FIG. 6 will be referenced to describe an example of the flow of a series of processes of the information processing system according to the present embodiment, with particular focus on processes related to the estimation of the position and the attitude of the terminal apparatus 20 in the information processing apparatus 10. FIG. 6 is a flowchart illustrating an example of the flow of a series of processes of the information processing system according to the present embodiment.

First, the information processing apparatus 10 (image analysis section 101) acquires the image captured by the imaging section 203 and performs analysis processing on the acquired image, and thereby recognizes the physical object (real object) captured as the subject in the image (S101). Note that the method of recognizing the physical object captured in the image is as described earlier as a process of the image analysis section 101.

Next, the information processing apparatus 10 (distance estimation section 103) acquires, from the distance measuring section 205, depth information indicating a measurement result of the distance to the physical object captured as the subject by the imaging section 203. Subsequently, the information processing apparatus 10 estimates the distance to the recognized physical object on the basis of the information indicating the physical object recognition result, and the acquired depth information (S103). Note that the method of estimating the distance to the recognized physical object is as described earlier as a process of the distance estimation section 103.

Next, the information processing apparatus 10 (size estimation section 105) estimates the size of the physical object in the real space on the basis of the information indicating the physical object recognition result and the information indicating the estimation result of the distance to the physical object (S105). Note that the method of estimating the size of the recognized physical object in the real space is as described earlier as a process of the size estimation section 105.

Next, the information processing apparatus 10 (position and attitude estimation section 107) estimates the relative position and attitude of the terminal apparatus 20 with respect to the physical object on the basis of the information indicating the physical object recognition result and the information indicating the estimation result of the size of the physical object. At this time, the information processing apparatus 10 recognizes that the size of the physical object is known on the basis of the acquired estimation result of the size of the physical object, thereby making it possible to estimate the relative position and attitude of the terminal apparatus 20 with respect to the physical object on the basis of the method described earlier. Also, at this time, the information processing apparatus 10 may estimate the relative position and attitude of the terminal apparatus 20 with respect to the recognized physical object on the basis of SLAM (S107).

On the basis of a series of processes like the above, the information processing apparatus 10 becomes able to estimate the position and the attitude of the terminal apparatus 20 in the real space. With this arrangement, for example, the information processing apparatus 10 also becomes able to present, to the user through the output section 201, a virtual object on the basis of AR technology so that the virtual object is superimposed onto the real space.

Note that the timing at which the information processing apparatus 10 executes the processes related to the estimation of the position and the attitude of the terminal apparatus 20 described above is not particularly limited. As a specific example, the information processing apparatus 10 may execute the processes related to the estimation of the position and the attitude of the terminal apparatus 20 described above in the case in which a symmetric physical object (such as a marker, for example) is captured in the image. Also, as another example, the information processing apparatus 10 may also execute the processes related to the estimation of the position and the attitude of the terminal apparatus 20 described above in the case in which a predetermined physical object is predicted to be captured by the imaging section (in other words, the physical object is predicted to be inside the angle of view of the imaging section) on the basis of SLAM.

In addition, the processes related to the size estimation of the target physical object and the processes related to the estimation of the position and the attitude of the terminal apparatus 20 based on the size estimation result by the information processing apparatus 10 are not limited to being executed only once, and may also be executed appropriately in accordance with a desired timing and a predetermined condition.

As a specific example, focusing on the case of estimating the position and the attitude of the terminal apparatus 20 on the basis of SLAM, in conditions in which the physical object (such as a marker) that acts as the reference for the estimation has not been captured, for example, changes in the position and the attitude of the terminal apparatus 20 are recognized on the basis of the detection results of various sensors (such as an acceleration sensor and an angular velocity sensor). However, error may occur in the recognition of changes in the position and the attitude of the terminal apparatus 20 based on the detection results of various sensors in some cases. Such error tends to accumulate every time the recognition is executed, and by extension, may affect the estimation results of the position and the attitude of the terminal apparatus 20 in some cases. On the other hand, even in such conditions, in the case in which the target physical object is captured, for example, the information processing apparatus 10 according to the present embodiment becomes able to execute the processes related to the estimation of the position and the attitude of the terminal apparatus 20 on the basis of the captured image, and thereby correct the error described above.

The above references FIG. 6 to describe an example of the flow of a series of processes of the information processing system according to the present embodiment, with particular focus on processes related to the estimation of the position and the attitude of the terminal apparatus 20 in the information processing apparatus 10.

<1.5. Evaluation>

As described above, in the information processing system 1 according to the present embodiment, the information processing apparatus 10 acquires an image of a physical object (real object) positioned in the real space captured by the imaging section, and a measurement result of the distance to the physical object. Additionally, the information processing apparatus 10 estimates the size of the physical object in the real space, on the basis of the size of the physical object in the image and the measurement result of the distance to the physical object. With this arrangement, even in the case in which the size of a physical object (such as a marker) used for localization is unknown, the information processing apparatus 10 according to the present embodiment is able to estimate the size of the physical object, and thus is able to estimate (recognize) the position and the attitude of the terminal apparatus 20 with respect to the physical object.

2. SECOND EMBODIMENT

Next, the information processing system according to a second embodiment of the present disclosure will be described. The present embodiment describes, for the case of using a physical object with known size candidates, such as what is called a television receiver, a display, a book, or the like for localization, an example of a mechanism for estimating the size of the physical object more precisely compared to the first embodiment described above.

<2.1. Basic Principle>

First, in the information processing system according to the present embodiment, the basic principle of the processes by which the information processing apparatus 10 estimates the position and the attitude of the terminal apparatus 20 will be described.

First, similarly to the first embodiment described above, the information processing apparatus 10 according to the present embodiment estimates the size of a physical object (real object) in a real space, on the basis of an image of the physical object positioned in the real space captured by the imaging section, and a measurement result of the distance to the physical object. On the other hand, in the case of estimating the size by a technique similar to the first embodiment, as the distance between the imaging section and the target physical object becomes greater, the resolution related to the measurement of the size of the physical object in the image falls, and by extension, the precision related to the estimation of the size of the physical object in the real space falls.

Accordingly, the information processing apparatus 10 according to the present embodiment targets a physical object with known size candidates, estimates the size of the physical object in the real space, and by comparing the estimation result of the size to the size candidates of the physical object, specifies the size of the physical object (in other words, corrects the estimation result of the size).

For example, FIG. 7 is an explanatory diagram for explaining an overview of the information processing system according to the present embodiment, and illustrates an example of size candidates for a television receiver or a display. Note that in FIG. 7, the units of the numerical values labeled height and width are centimeters (cm). As illustrated in FIG. 7, the screen sizes of television receivers and displays have predetermined candidates with discrete values. Specifically, as illustrated in FIG. 7, from 32 inches to 65 inches, 32 inches, 37 inches, 42 inches, 46 inches, 50 inches, 55 inches, 60 inches, and 65 inches are set as screen size candidates. Also, for books, size candidates are set as what are called A sizes (such as A4 (210 mm×297 mm), A5 (148 mm×210 mm), and A6 (105 mm×148 mm)) and B sizes (such as B4 (257 mm×364 mm), B5 (182 mm×257 mm), B6 (128 mm×182 mm), and small B6 (112 mm×174 mm)). Similarly, for paper media such as posters, size candidates are set as what is called the A series (such as A0, A1, A2, A3, . . . ) and the B series (such as B0, B1, B2, B3, . . . ).

As a specific example, the information processing apparatus 10 according to the present embodiment estimates the size in the real space of the marker V10 displayed on the screen of the display apparatus 50 as illustrated in FIG. 2 by a technique similar to the first embodiment, and on the basis of the estimation result, estimates the size of the screen. Subsequently, the information processing apparatus 10 compares the estimation result of the size of the screen to screen size candidates like those illustrated in FIG. 7, and specifies a candidate closer to the estimation result of the size as the size of the screen.

By such a configuration, even under circumstances in which the distance between the imaging section and the target physical object is large, and the precision related to the estimation of the size of the physical object falls, the information processing apparatus 10 becomes able to specify the size of the physical object in the real space more precisely.

The above references FIG. 7 to describe, in the information processing system according to the present embodiment, the basic principle of the processes by which the information processing apparatus 10 estimates the position and the attitude of the terminal apparatus 20.

<2.2. Functional Configuration>

Figure 8:
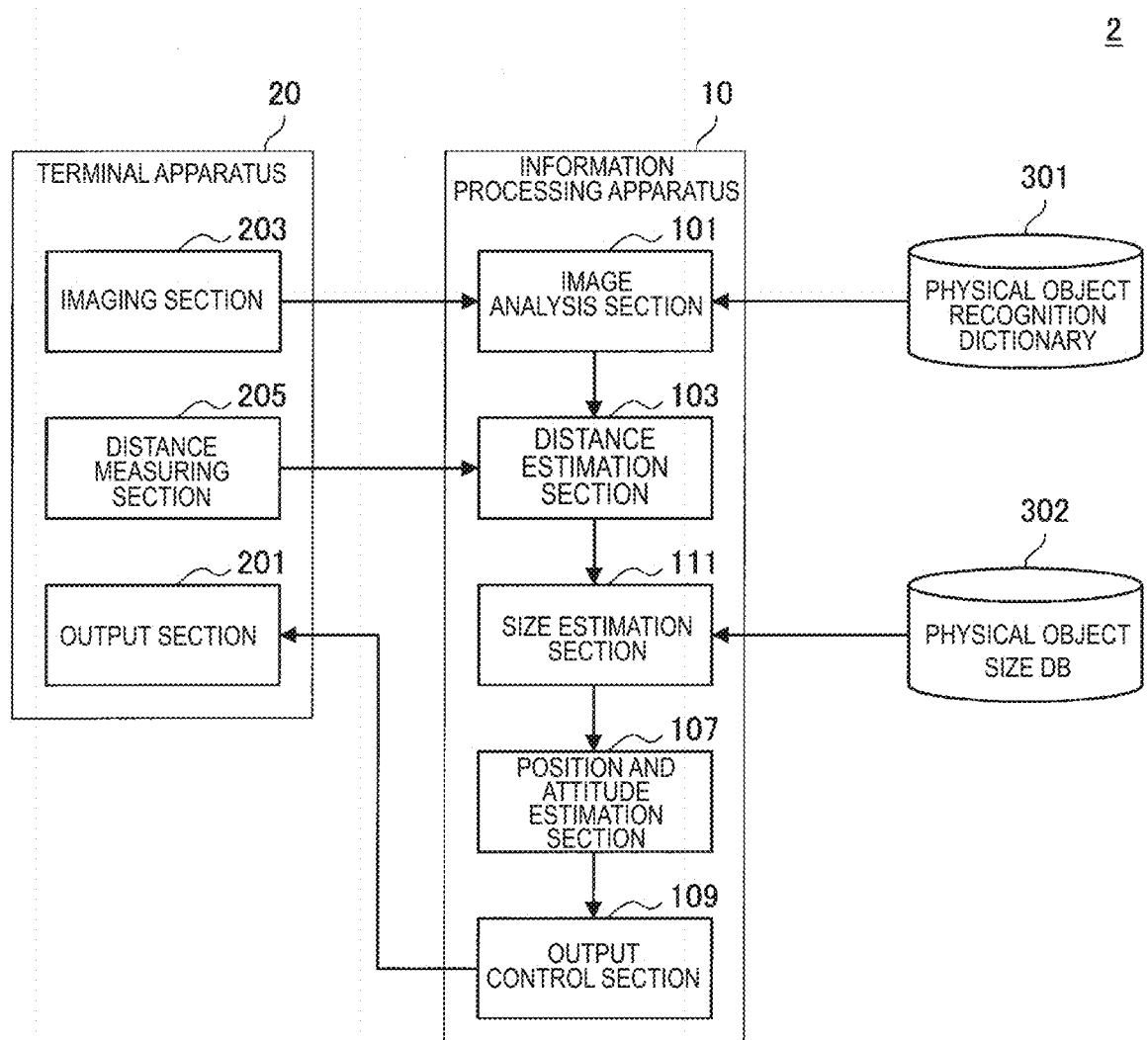
FIG. 8 is a block diagram illustrating an example of a functional configuration of the information processing system according to the embodiment.

Next, FIG. 8 will be referenced to describe an example of the functional configuration of the information processing system according to the present embodiment. FIG. 8 is a block diagram illustrating an example of a functional configuration of the information processing system according to the present embodiment.

As illustrated in FIG. 8, in the information processing system 2 according to the present embodiment, part of the configuration is different from the information processing system 1 (see FIG. 5) according to the first embodiment described above. More specifically, in the information processing apparatus 10 according to the present embodiment, the configuration labeled by the reference sign 111, which corresponds to the size estimation section 105 in the information processing apparatus 10 according to the first embodiment described above, is different. Also, the information processing system 2 according to the present embodiment includes a physical object size DB 302. Accordingly, in this description, the information processing system 2 according to the present embodiment will be described with particular focus on the size estimation section 111 and the physical object size DB 302 which are different from the information processing system 1 according to the first embodiment described above. Note that detailed description will be omitted for parts which are substantially similar to the information processing system 1 according to the first embodiment described above.

In the information processing apparatus 10 according to the present embodiment, the image analysis section 101 acquires the image captured by the imaging section 203 and performs analysis processing on the acquired image, and thereby recognizes a physical object captured as the subject in the image. Note that at this time, the image analysis section 101 recognizes in particular a physical object with known size candidates, such as a television receiver, a display, a book, or the like. Note that the physical object recognition method is similar to the first embodiment described above. Subsequently, the image analysis section 101 outputs information indicating a recognition result of the physical object captured in the image to the distance estimation section 103. Note that the part of the image analysis section 101 that acquires the image captured by the imaging section 203 corresponds to the part of the "acquisition section" that acquires an image of a real object.

The distance estimation section 103 estimates the distance to the recognized physical object on the basis of the information indicating the physical object recognition result acquired from the image analysis section 101, and depth information acquired from the distance measuring section 205. Note that this operation is similar to the distance estimation section 103 according to the first embodiment described above. Subsequently, the distance estimation section 103 outputs information indicating the acquired physical object recognition result and information indicating the estimation result of the distance to the physical object to the size estimation section 111. Note that the part of the distance estimation section 103 that acquires depth information corresponds to the part of the "acquisition section" that acquires a distance measurement result.

The size estimation section 111 acquires the information indicating the physical object recognition result and the information indicating the estimation result of the distance to the physical object from the distance estimation section 103, and on the basis of the acquired information, estimates the size of the physical object in the real space.

As a specific example, the case of estimating the size in the real space of the screen of the display apparatus 50, such as a television receiver, a display, or the like, will be focused on. In this case, for example, it is sufficient for the size estimation section 111 to estimate the size in the real space of the marker V10 displayed on the screen of the display apparatus 50 as illustrated in FIG. 2, and on the basis of the estimation result of the size of the marker V10, estimate the size of the screen of the display apparatus 50 in the real space. Also, as another example, in the case in which the screen itself of the display apparatus 50 can be recognized directly, the size estimation section 111 may also directly estimate the size in the real space of the screen. Note that the method of estimating the size of the recognized physical object in the real space is similar to the first embodiment described above.

Next, the size estimation section 111 compares the estimation result of the size of the recognized physical object to the size candidates of the physical object, and on the basis of the comparison result, specifies a candidate closer to the estimation result of the size as the size of the physical object. Note that information indicating the size candidates of target physical objects, such as a television receiver, a display, a book, and the like, may be stored in advance in a storage area readable by the information processing apparatus 10. For example, the physical object size DB 302 illustrates an example of a storage area for storing information indicating the size candidates of target physical objects, such as a television receiver, a display, a book, and the like.

Subsequently, the size estimation section 111 outputs information indicating the acquired physical object recognition result and information indicating the specification result of the size of the physical object to the position and attitude estimation section 107.

Note that the following processes are similar to the information processing apparatus 10 according to the first embodiment described above. In other words, the position and attitude estimation section 107 estimates the relative position and attitude of the terminal apparatus 20 with respect to the physical object on the basis of the information indicating the physical object recognition result and the information indicating the estimation result of the size of the physical object. Note that at this time, the position and attitude estimation section 107 may also correct the estimation result of the distance to the recognized physical object on the basis of the specification result of the size of the physical object, and estimate the relative position and attitude of the terminal apparatus 20 with respect to the physical object on the basis of the correction result. By such a configuration, it becomes possible to estimate the position and the attitude of the terminal apparatus 20 more precisely.

Also, the output control section 109 recognizes the positional relationship between the terminal apparatus 20 in the real space and the recognized physical object on the basis of the information indicating the physical object recognition result and the information indicating the estimation results of the position and the attitude of the terminal apparatus 20 in the real space. Subsequently, in accordance with the positional relationship between the terminal apparatus 20 and the recognized physical object in the real space, for example, the output control section 109 causes the output section 201 to display a virtual object on the basis of the AR technology, so that the virtual object is superimposed onto a desired position in the real space.

The above references FIG. 8 to describe an example of a functional configuration of the information processing system according to the present embodiment.

<2.3. Processes>

Figure 9:
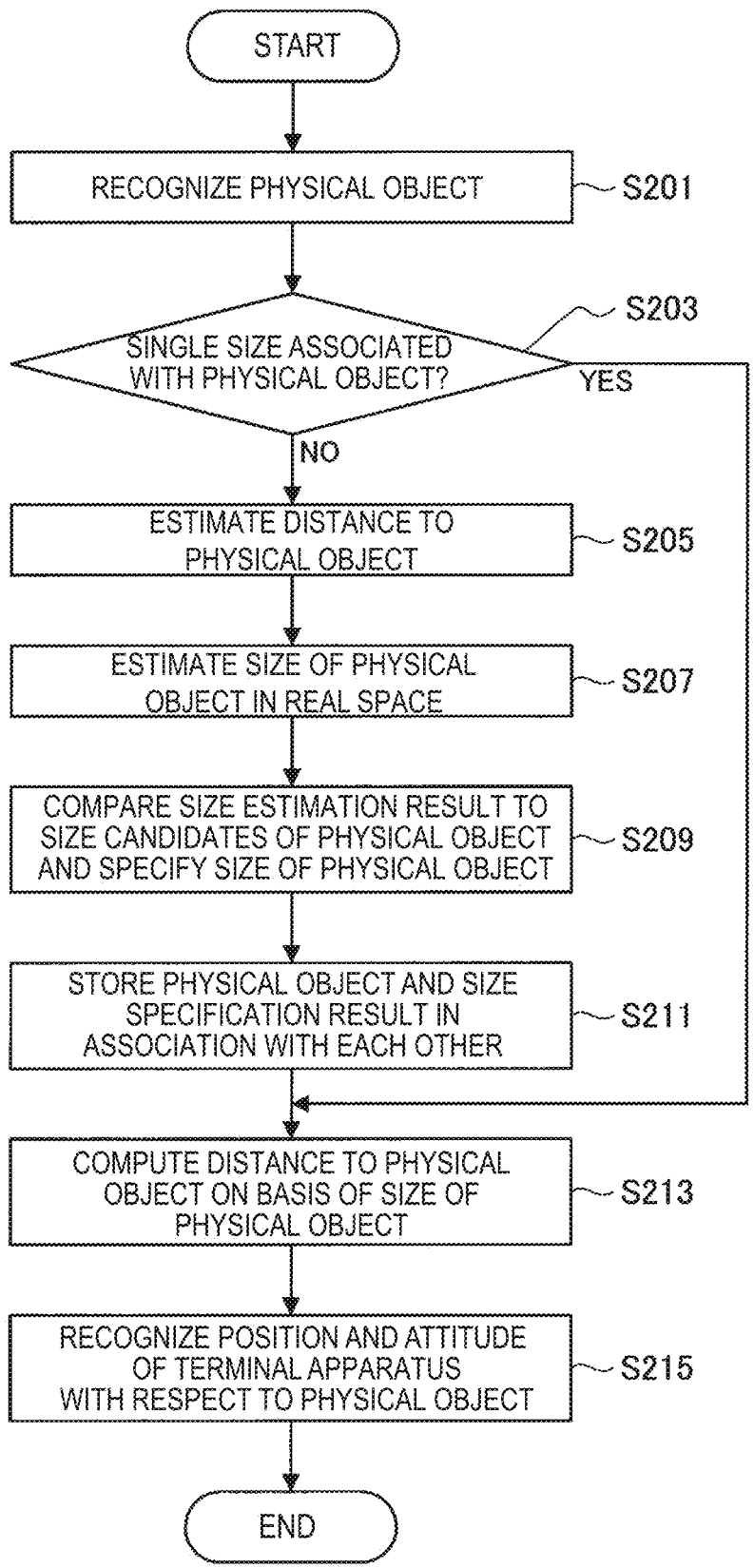
FIG. 9 is a flowchart illustrating an example of the flow of a series of processes of an information processing system 1 according to the embodiment.

Next, FIG. 9 will be referenced to describe an example of the flow of a series of processes of the information processing system 1 according to the present embodiment, with particular focus on processes related to the estimation of the position and the attitude of the terminal apparatus 20 in the information processing apparatus 10. FIG. 9 is a flowchart illustrating an example of the flow of a series of processes of the information processing system 1 according to the present embodiment.

First, the information processing apparatus 10 (image analysis section 101) acquires the image captured by the imaging section 203 and performs analysis processing on the acquired image, and thereby recognizes the physical object (real object) captured as the subject in the image (S201). Note that the method of recognizing the physical object captured in the image is as described earlier as a process of the image analysis section 101.

Next, the information processing apparatus 10 checks whether a single size is associated with the recognized physical object (that is, whether or not the size of the physical object is known) (S203).

In the case in which a single size is associated with the recognized physical object (S203, YES), the information processing apparatus 10 recognizes that the size of the physical object is known. In this case, the information processing apparatus 10 computes the distance from the terminal apparatus 20 to the physical object on the basis of the recognition result of the physical object and the size of the physical object (S213), and estimates (recognizes) the relative position and attitude of the terminal apparatus 20 with respect to the physical object on the basis of the computation result of the distance (S205).

On the other hand, in the case in which a single size is not associated with the recognized physical object (S203, NO), the information processing apparatus 10 (distance estimation section 103) acquires, from the distance measuring section 205, the depth information indicating the estimation result of the distance to the physical object captured as the subject by the imaging section 203. Subsequently, the information processing apparatus 10 estimates the distance to the recognized physical object on the basis of the information indicating the physical object recognition result, and the acquired depth information (S205). Note that the method of estimating the distance to the recognized physical object is as described earlier as a process of the distance estimation section 103.

Next, the information processing apparatus 10 (size estimation section 111) estimates the size of the physical object in the real space on the basis of the information indicating the physical object recognition result and the information indicating the estimation result of the distance to the physical object (S207). Also, the information processing apparatus 10 compares the estimation result of the size of the recognized physical object to the size candidates of the physical object, and on the basis of the comparison result, specifies a candidate closer to the estimation result of the size as the size of the physical object (S209). Note that the method of specifying the size in the real space of the recognized physical object is as described earlier as a process of the size estimation section 111.

Subsequently, the information processing apparatus 10 stores the recognized physical object and the specification result of the size of the physical object in association with each other (S211).

Next, the information processing apparatus 10 (position and attitude estimation section 107) may also correct the estimation result of the distance to the physical object on the basis of the specification result of the size of the physical object (S213). With this arrangement, the information processing apparatus 10 becomes able to estimate the distance to the recognized physical object more accurately.

Additionally, the information processing apparatus 10 estimates (recognizes) the relative position and attitude of the terminal apparatus 20 with respect to the physical object on the basis of the information indicating the physical object recognition result and the information indicating the estimation result of the size of the physical object. Also, at this time, the information processing apparatus 10 may estimate the relative position and attitude of the terminal apparatus 20 with respect to the recognized physical object on the basis of SLAM (S215). Note that the method of estimating the relative position and attitude of the terminal apparatus 20 with respect to the physical object is as described earlier as a process of the position and attitude estimation section 107.

On the basis of a series of processes like the above, the information processing apparatus 10 becomes able to estimate the position and the attitude of the terminal apparatus 20 in the real space. With this arrangement, for example, the information processing apparatus 10 also becomes able to present, to the user through the output section 201, a virtual object on the basis of AR technology so that the virtual object is superimposed onto the real space.

Note that the timing at which the information processing apparatus 10 executes the processes related to the estimation of the position and the attitude of the terminal apparatus 20 described above is not particularly limited. As a specific example, the information processing apparatus 10 may execute the processes related to the estimation of the position and the attitude of the terminal apparatus 20 described above in the case in which a symmetric physical object (such as a marker, for example) is captured in the image. Also, as another example, the information processing apparatus 10 may also execute the processes related to the estimation of the position and the attitude of the terminal apparatus 20 described above in the case in which a predetermined physical object is predicted to be captured by the imaging section (in other words, the physical object is predicted to be inside the angle of view of the imaging section) on the basis of SLAM.

Also, as another example, the information processing apparatus 10 may also execute the processes related to the estimation of the position and the attitude of the terminal apparatus 20 described above on the basis of the estimation result of the distance to the target physical object. As a more specific example, the information processing apparatus 10 may also execute the processes related to the estimation of the position and the attitude of the terminal apparatus 20 described above in a case in which the estimation result of the distance between the target physical object and the terminal apparatus 20 is a threshold value or greater (that is, more distant). As described earlier, as the distance between the imaging section (that is, the terminal apparatus 20) and the target physical object becomes greater, the precision related to the estimation of the size of the physical object in the real space based on the size of the physical object in the image tends to fall. Even in such a case, the information processing apparatus 10 according to the present embodiment becomes able to estimate the size of the target physical object more precisely on the basis of the processes described above.

In addition, the processes related to the size estimation of the target physical object and the processes related to the estimation of the position and the attitude of the terminal apparatus 20 based on the size estimation result by the information processing apparatus 10 are not limited to being executed only once, and may also be executed appropriately in accordance with a desired timing and a predetermined condition. This point is similar to the first embodiment described earlier.

In addition, the information processing apparatus 10 may also selectively switch between executing the processes related to the estimation of the position and the attitude of the terminal apparatus 20 described in the present embodiment, and executing processes related to the estimation of the position and the attitude of the terminal apparatus 20 based on another method, depending on the circumstances. As a specific example, in a case in which the estimation result of the distance between the target physical object and the terminal apparatus 20 is a threshold value or greater (that is, more distant), the information processing apparatus 10 may estimate the position and the attitude of the terminal apparatus 20 on the basis of the method described in the present embodiment. On the other hand, in a case in which the estimation result of the distance between the target physical object and the terminal apparatus 20 is less than the threshold value (that is, positioned closer), the information processing apparatus 10 may estimate the position and the attitude of the terminal apparatus 20 on the basis of another method (for example, the method described as the first embodiment).

Similarly, the information processing apparatus 10 may also selectively switch between executing the processes related to the estimation of the size of the physical object described in the present embodiment, and executing processes related to the estimation of the size of the physical object described in the first embodiment described earlier, depending on the circumstances. As a specific example, in a case in which the estimation result of the distance between the target physical object and the terminal apparatus 20 is a threshold value or greater (that is, more distant), the information processing apparatus 10 may estimate the size of the physical object to use for localization on the basis of the method described in the present embodiment. On the other hand, in a case in which the estimation result of the distance between the target physical object and the terminal apparatus 20 is less than the threshold value (that is, positioned closer), the information processing apparatus 10 may estimate the size of the physical object to use for localization on the basis of the method described in the first embodiment described earlier.

The above references FIG. 9 to describe an example of the flow of a series of processes of the information processing system 1 according to the present embodiment, with particular focus on processes related to the estimation of the position and the attitude of the terminal apparatus 20 in the information processing apparatus 10.

<2.4. Evaluation>

As described above, in the information processing system 2 according to the present embodiment, the information processing apparatus 10 targets a physical object with known size candidates, and estimates the size of the physical object in the real space on the basis of the size of the physical object in the real image and the measurement result of the distance to the physical object. Subsequently, the information processing apparatus 10 compares the estimation result of the size of the physical object to the size candidates of the physical object, and specifies a candidate closer to the estimation result of the size as the size of the screen. According to a configuration like the above, compared to the first embodiment described earlier, the information processing apparatus 10 according to the present embodiment becomes able to estimate the size of a physical object (such as a marker) used for localization more precisely. Also, according to such a configuration, even in the case in which the size of the physical object used for localization is unknown, the information processing apparatus 10 according to the present embodiment estimates the size of the physical object, and thereby becomes capable of estimating (recognizing) the position and the attitude of the terminal apparatus 20 with respect to the physical object more precisely.

3. HARDWARE CONFIGURATION EXAMPLE

Figure 10:
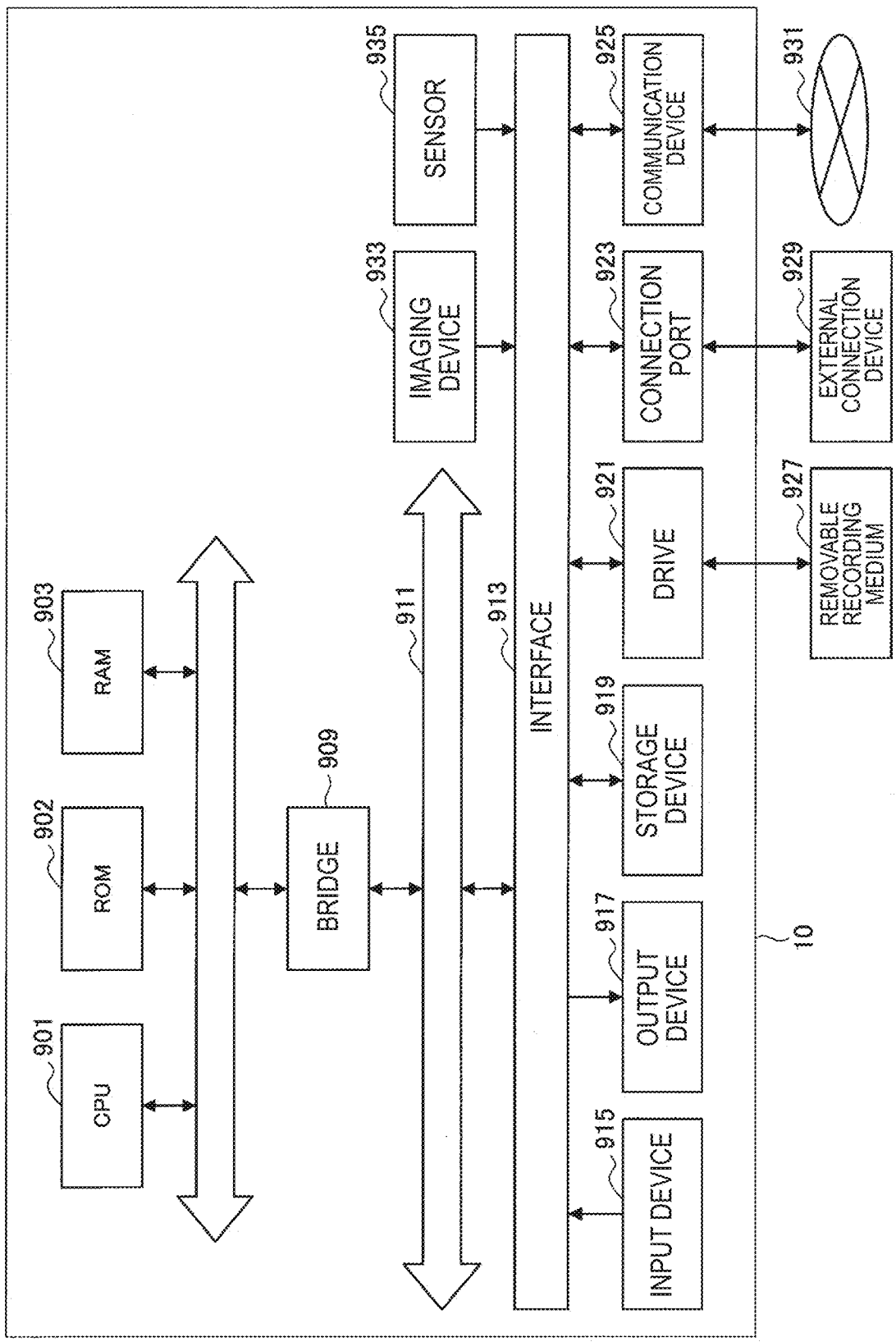
FIG. 10 is a block diagram illustrating an exemplary hardware configuration of an information processing apparatus according to an embodiment of the present disclosure.

Next, a hardware configuration of the information processing apparatus 10 according to an embodiment of the present disclosure will be described with reference to FIG. 10. FIG. 10 is a block diagram illustrating a hardware configuration example of the information processing apparatus 10 according to an embodiment of the present disclosure.

As illustrated in FIG. 10, the information processing apparatus 10 includes a central processing unit (CPU) 901, a read only memory (ROM) 903, and a random access memory (RAM) 905. In addition, the information processing apparatus 10 may include a host bus 907, a bridge 909, an external bus 911, an interface 913, an input device 915, an output device 917, a storage device 919, a drive 921, a connection port 923, and a communication device 925. Further, the information processing apparatus 100 may include an imaging device 933 and a sensor 935 as necessary. The information processing apparatus 10 may include a processing circuit such as a digital signal processor (DSP) or an application specific integrated circuit (ASIC) instead of or in addition to the CPU 901.

The CPU 901 serves as an operation processing device and a control device, and controls all of or a part of the operations in the information processing apparatus 10 in accordance with various programs recorded in the ROM 903, the RAM 905, the storage device 919 or a removable recording medium 927. The ROM 903 stores programs and operation parameters used by the CPU 901. The RAM 905 temporarily stores program used in the execution of the CPU 901 and parameters that changes as appropriate in the execution. The CPU 901, ROM 903, and RAM 905 are connected to each other by the host bus 907 including an internal bus such as a CPU bus. In addition, the host bus 907 is connected to the external bus 911 such as a peripheral component interconnect/interface (PCI) bus via the bridge 909. Note that, the above-described image analysis section 101, distance estimation section 103, size estimation sections 105 and 111, position and attitude estimation section 107, and output control section 109 may be implemented by the CPU 901, for example.

The input device 915 is, for example, a device operated by a user such as a mouse, a keyboard, a touch panel, buttons, switches, a lever, or the like. The input device 915 may include a mic that detects a sound of a user. The input device 915 may be, for example, a remote control unit using infrared light or other radio waves, or may be an external connection device 929 such as a portable phone operable in response to the operation of the information processing apparatus 10. The input device 915 includes an input control circuit that generates an input signal on the basis of the information input by a user and outputs the input signal to the CPU 901. By operating the input device 915, a user can input various types of data to the information processing apparatus 10 or issue instructions for causing the information processing apparatus 10 to perform a processing operation. In addition, the imaging device 933 to be described below can also function as an input device by imaging a motion or the like of a hand of the user.

The output device 917 includes a device capable of visually or audibly notifying a user of the acquired information. The output device 917 may be, for example, a display device such as a liquid crystal display (LCD), a plasma display panel (PDP), an organic electro-luminescence (EL) display, and a projector, a hologram display device, an audio output device, such as a speaker or a headphone, and a printer. The output device 917 outputs the results obtained from the process of the information processing apparatus 10 in a form of video such as text or an image, and outputs voice or sound. In addition, the output device 917 may include a light or the like to brighten the surroundings. Note that, the above-described output section 201 may be implemented by the output device 917, for example.

The storage device 919 is a device for data storage configured as an example of a storage unit of the information processing apparatus 10. The storage device 919 includes, for example, a magnetic storage device such as a hard disk drive (HDD), a semiconductor storage device, an optical storage device, or a magneto-optical storage device. The storage device 919 stores programs to be executed by the CPU 901, various data, and various data obtained from the outside. Note that, the above-described physical object recognition dictionary 301 and physical object size DB 302 may be implemented by the storage device 919, for example.

The drive 921 is a reader/writer for the removable recording medium 927 such as a magnetic disk, an optical disk, a magneto-optical disk, or a semiconductor memory, and is incorporated in the information processing apparatus 10 or externally attached thereto. The drive 921 reads information recorded in the attached removable recording medium 927 and outputs the information to the RAM 905. Further, the drive 921 writes record in the attached removable recording medium 927.

The connection port 923 is a port used to directly connect devices to the information processing apparatus 10. The connection port 923 may be, for example, a universal serial bus (USB) port, an IEEE1394 port, a small computer system interface (SCSI) port, or the like. In addition, the connection port 923 may be an RS-232C port, an optical audio terminal, High-Definition Multimedia Interface (HDMI) (registered trademark) port, or the like. By connecting the external connection device 929 to the connection port 923, various data may be exchanged between the information processing apparatus 10 and the external connection device 929.

The communication device 925 is, for example, a communication interface including a communication device or the like for connection to a communication network 931. The communication device 925 may be, for example, a communication card for a wired or wireless local area network (LAN), Bluetooth (registered trademark), wireless USB (WUSB), or the like. In addition, the communication device 925 may be a router for optical communication, a router for asymmetric digital subscriber line (ADSL), a modem for various kinds of communications, or the like. The communication device 925 transmits and receives signals to and from, for example, the Internet or other communication devices using a predetermined protocol such as TCP/IP. In addition, the communication network 931 to be connected to the communication device 925 is a network connected in a wired or wireless manner, and is, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal oxide semiconductor (CMOS), as well as various members such as a lens for controlling the formation of a subject image on the image sensor, for example. The imaging device 933 may be a device that captures still images and may also be a device that captures moving images. Note that, the above-described imaging section 203 may be implemented by the imaging device 933, for example.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 10 itself, such as the attitude of the case of the information processing apparatus 10, as well as information regarding the environment surrounding the information processing apparatus 10, such as brightness or noise surrounding the information processing apparatus 10, for example. The sensor 935 may also include a global positioning system (GPS) sensor that receives GPS signals and measures the latitude, longitude, and altitude of the device.

The foregoing thus illustrates an exemplary hardware configuration of the information processing apparatus 10. Each of the above components may be realized with general-purpose members or hardware specialized in the function of each component. Such a configuration may also be modified as appropriate in accordance with the technological level at the time of the implementation.

Further, it is also possible to create a program for causing hardware such as a processor, a memory, and a storage incorporated into a computer to exert a function equivalent to the structural elements included in the above-described information processing apparatus 10. In addition, it is also possible to provide a computer readable storage medium in which the program is recorded.

4. CONCLUSION

The preferred embodiment(s) of the present disclosure has/have been described above in detail with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an acquisition section that acquires an image of a real object in a real space captured by a predetermined imaging section, and a measurement result of a distance to the real object by a predetermined distance measuring section; and an estimation section that estimates a size of the real object in the real space on the basis of a size of the real object in the image and the measurement result of the distance, and by comparing the estimation result of the size to a plurality of preset size candidates, specifies the size of the real object in the real space.

(2)

The information processing device according to (1), including:

a recognition section that estimates a positional relationship between the real object and the imaging section on the basis of the specification result of the size of the real object in the real space, and recognizes at least one of a position and a direction of the imaging section on the basis of the estimation result.

(3)

The information processing apparatus according to (2), in which the recognition section corrects a recognition result of at least one of the position and the direction of the imaging section recognized previously, on the basis of the estimation result of the positional relationship between the real object and the imaging section.

(4)

The information processing apparatus according to (2) or (3), including:

a display control section that causes a virtual object to be displayed such that the virtual object is superimposed onto the real space, in which the display control section controls at least one of a display position and a display size of the virtual object on the basis of a recognition result of at least one of the position and the direction of the imaging section.

(5)

The information processing apparatus according to any one of (1) to (4), in which the estimation section corrects the measurement result of the distance on the basis of the specification result of the size of the real object.

(6)

The information processing apparatus according to any one of (1) to (5), in which the acquisition section acquires the image of the real object on which a predetermined marker is presented, and the estimation section estimates the size of the real object in the real space on the basis of a size of the marker in the image, and the measurement result of the distance.

(7)

The information processing apparatus according to any one of (1) to (6), in which in a case in which an image in which the real object is captured is acquired, the estimation section executes a process related to the estimation of the size of the real object in the real space.

(8)

The information processing apparatus according to any one of (1) to (6), in which the estimation section estimates a change in at least one of a position and a direction of the imaging section on the basis of a detection result of a predetermined detection section, and controls an execution timing of a process related to the estimation of the size of the real object in the real space on the basis of the estimation result.

(9)

The information processing apparatus according to (8), in which in a case in which the real object is predicted to be inside an angle of view of the imaging section on the basis of the estimation result of a change in at least one of the position and the direction of the imaging section, the estimation section executes a process related to the estimation of the size of the real object in the real space.

(10)

The information processing apparatus according to any one of (1) to (6), in which the estimation section controls an execution timing of a process related to the estimation of the size of the real object in the real space on the basis of the measurement result of the distance.

(11)

The information processing apparatus according to (10), in which in a case in which the measurement result of the distance is a threshold value or greater, the estimation section executes a process related to the estimation of the size of the real object in the real space.

(12)

An information processing method including: acquiring an image of a real object in a real space captured by a predetermined imaging section, and a measurement result of a distance to the real object by a predetermined distance measuring section; and estimating, by a processor, a size of the real object in the real space on the basis of a size of the real object in the image and the measurement result of the distance, and by comparing the estimation result of the size to a plurality of preset size candidates, specifying the size of the real object in the real space.

(13)

A recording medium storing a program for causing a computer to execute:

acquiring an image of a real object in a real space captured by a predetermined imaging section, and a measurement result of a distance to the real object by a predetermined distance measuring section; and estimating a size of the real object in the real space on the basis of a size of the real object in the image and the measurement result of the distance, and by comparing the estimation result of the size to a plurality of preset size candidates, specifying the size of the real object in the real space.

REFERENCE SIGNS LIST 1, 2 information processing system
10 information processing apparatus
101 image analysis section
103 distance estimation section
105 size estimation section
107 position and attitude estimation section
109 output control section
111 size estimation section
20 terminal apparatus
201 output section
203 imaging section
205 distance measuring section
50 display apparatus
301 physical object recognition dictionary
302 physical object size DB

The invention claimed is:

1. An information processing apparatus, comprising:
an acquisition section configured to acquire an image of a real object in a real space and a measurement result of a distance between the information processing apparatus and the real object, wherein
an imaging section captures the image of the real object, and
a distance measuring section measures the distance between the information processing apparatus and the real object; and
an estimation section configured to:
estimate a size of the real object based on a size of the real object in the image and the measurement result of the distance,
specify the size of the real object based on a comparison of an estimation result of the size to a plurality of size candidates; and
control an execution time of a first process related to the estimation of the size of the real object in the real space based on the measurement result of the distance.

2. The information processing apparatus according to claim 1, further comprising a recognition section configured to:
estimate a positional relationship between the real object and the imaging section based on the specified size of the real object; and
recognize at least one of a position of the imaging section or a direction of the imaging section based on the estimation result.

3. The information processing apparatus according to claim 2, wherein the recognition section is further configured to correct a recognition result of at least one of the position of the imaging section or the direction of the imaging section based on the estimation result of the positional relationship between the real object and the imaging section.

4. The information processing apparatus according to claim 2, comprising a display control section configured to:
control a display of a virtual object, wherein the virtual object is superimposed onto the real space; and
control at least one of a display position of the virtual object or a display size of the virtual object based on the recognition of at least one of the position of the imaging section or the direction of the imaging section.

5. The information processing apparatus according to claim 1, wherein the estimation section is further configured to correct the measurement result of the distance based on the specified size of the real object.

6. The information processing apparatus according to claim 1, wherein
the acquisition section is further configured to acquire the image of the real object that includes a specific marker, and
the estimation section is further configured to estimate the size of the real object based on a size of the marker in the image and the measurement result of the distance.

7. The information processing apparatus according to claim 1, wherein
the estimation section is further configured to execute a second process related to the estimation of the size of the real object based on the acquisition of the image that includes the real object.

8. The information processing apparatus according to claim 1, wherein the estimation section is further configured to:
estimate a change in at least one of a position of the imaging section or a direction of the imaging section based on a detection result of a specific detection section; and
control an execution timing of a third process related to the estimation of the size of the real object based on the estimation result.

9. The information processing apparatus according to claim 8, wherein
the estimation section is further configured to execute the third process based on a prediction that indicates the real object is inside an angle of view of the imaging section, and
the prediction is based on the estimation result of the change in at least one of the position of the imaging section or the direction of the imaging section.

10. The information processing apparatus according to claim 1, wherein the estimation section is further configured to execute the first process related to the estimation of the size of the real object in the real space based on the measurement result of the distance that is equal to or greater than a threshold value.

11. An information processing method, comprising:
acquiring, by a processor, an image of a real object in a real space and a measurement result of a distance between an information processing apparatus and the real object, wherein
an imaging section captures the image of the real object, and
a distance measuring sections measures the distance between the information processing apparatus and the real object;
estimating, by the processor, a size of the real object in the real space based on a size of the real object in the image and the measurement result of the distance;
specifying the size of the real object based on a comparison of an estimation result of the size to a plurality of size candidates; and
controlling an execution time of a process related to the estimation of the size of the real object in the real space based on the measurement result of the distance.

12. A non-transitory computer-readable medium having stored thereon computer-executable instructions that, when executed by a processor, cause the processor to execute operations, the operations comprising:
- acquiring an image of a real object in a real space and a measurement result of a distance between an information processing apparatus and the real object, wherein
  - an imaging section captures the image of the real object, and
  - a distance measuring section measures the distance between the information processing apparatus and the real object;
- estimating a size of the real object based on a size of the real object in the image and the measurement result of the distance;
- specifying the size of the real object based on a comparison of an estimation result of the size to a plurality of size candidates; and
- controlling an execution time of a process related to the estimation of the size of the real object in the real space based on the measurement result of the distance.

13. An information processing apparatus, comprising:
- an acquisition section configured to acquire an image of a real object in a real space and a measurement result of a distance between the information processing apparatus and the real object, wherein
  - an imaging section captures the image of the real object, and
  - a distance measuring section measures the distance between the information processing apparatus and the real object;
- an estimation section configured to:
  - estimate a size of the real object based on a size of the real object in the image and the measurement result of the distance; and
  - specify the size of the real object based on a comparison of an estimation result of the size to a plurality of size candidates; and
- a recognition section configured to:
  - estimate a positional relationship between the real object and the imaging section based on the specified size of the real object; and
  - recognize at least one of a position of the imaging section or a direction of the imaging section based on the estimation result.

* * * * *